United States Patent [19]

Ormond

[11] Patent Number: 5,243,545

[45] Date of Patent: Sep. 7, 1993

[54] DATA LINEARIZATION SYSTEM

[76] Inventor: A. Newman Ormond, 12030 E. Rivera Rd., Santa Fe Springs, Calif. 90670-2291

[21] Appl. No.: 696,118

[22] Filed: May 6, 1991

[51] Int. Cl.[5] .............................................. G01C 25/00
[52] U.S. Cl. ......................... 364/571.01; 364/571.02; 364/573; 324/130; 324/132; 73/1 B
[58] Field of Search .................. 73/1 B, 718, 724, 756; 324/99 D, 74, 130, 132; 338/5; 371/167; 364/719, 571.01, 571.02, 571.03, 571.04, 571.05, 571.06, 571.07, 571.08, 573; 361/283; 177/25.14, 139, 141

[56] References Cited

U.S. PATENT DOCUMENTS

| | | | |
|---|---|---|---|
| 4,282,578 | 8/1981 | Payne et al. | 364/573 |
| 4,403,296 | 9/1983 | Prosky | 364/573 |
| 4,535,857 | 8/1985 | Haze | 73/1 B |
| 4,847,794 | 7/1989 | Hrubes | 364/571.04 |
| 4,912,397 | 3/1990 | Gale et al. | 364/573 |
| 5,089,979 | 2/1992 | McEachern et al. | 364/571.04 |
| 5,090,493 | 2/1992 | Bergan et al. | 338/5 |

Primary Examiner—Jack B. Harvey
Assistant Examiner—Hal D. Wachsman
Attorney, Agent, or Firm—Kelly Bauersfeld & Lowry

[57] ABSTRACT

An improved method and related apparatus for linearizing and spanning of the output from transducer systems such as load cells and the like. The method and system provide for deriving a constant that only requires calibration at mid-scale and full scale loads. The constant can thereafter be used in equations which correct subsequent data for nonlinearity and span so that the transducer system displays data in absolute units for all readings from zero to full scale.

15 Claims, 3 Drawing Sheets

A COMPARISON BETWEEN AN APPLICABLE PARABOLIC CURVE AND TRANSDUCER NONLINEAR CHARACTERISTICS

| $P_i$ | $R_i$ |
|---|---|
| 0 | 0 |
| 10000 | 9970 |
| 20000 | 19950 |
| 30000 | 29940 |
| 40000 | 39935 |
| 50000 | 49935 |
| 60000 | 59935 |
| 70000 | 69945 |
| 80000 | 79960 |
| 90000 | 89980 |
| 100000 | 99995 |

ORIGINAL CALIBRATION

| $P_i$ | $F_i$ |
|---|---|
| 0 | 0 |
| 10000 | 9992 |
| 20000 | 19990 |
| 30000 | 29992 |
| 40000 | 39995 |
| 50000 | 49997 |
| 60000 | 59995 |
| 70000 | 69998 |
| 80000 | 80000 |
| 90000 | 90003 |
| 100000 | 99995 |

LINEARIZED ONLY

| $P_i$ | $F_i$ |
|---|---|
| 0 | 0 |
| 10000 | 9993 |
| 20000 | 19991 |
| 30000 | 29994 |
| 40000 | 39997 |
| 50000 | 50000 |
| 60000 | 59998 |
| 70000 | 70001 |
| 80000 | 80004 |
| 90000 | 90007 |
| 100000 | 100000 |

LINEARIZED AND SPANNED

Nc% = DEVIATION IN % OF FS AFTER LINEARIZATION AND SPANNING

Nu% = DEVIATION IN % OF FS AFTER LINEARIZATION AND SPANNING

DEVIATION IN % OF FULL SCALE BEFORE AND AFTER LINEARIZATION

DATA LINEARIZATION SYSTEM

BACKGROUND OF THE INVENTION

This invention relates generally to methods and apparatus for linearization and spanning of transducer systems such as those using load cells and the like that have signal outputs versus input approach mathematical curves. More specifically, this invention relates to an improved transducer calibration method and associated apparatus for spanning and linearization of transducer data by employing an extremely small number of calibration data readings.

Transducers such as those that use strain gauges and other phenomena are well known in the art for providing output or data representative of an applied mechanical phenomena with nonlinear characteristics similar to a simple continuous curve. Load cells are included as one of the most common examples that apply; however, other phenomena such as heat transfer, gas diffusion, and the like might be included.

Inherent characteristics of load cells and/or transducers are well known to have outputs that are nonlinear over the useful range of the input. It has, therefore, been the practice to compensate for these nonlinear characteristics by either modifying the actual transducer output signal or by creating special transducer elements that have improved linear configurations. Most of these techniques are approximate at best and require substantial expenditures in time and money to accomplish.

For instance, approximate linearization of load cell data has been obtained through the use of circuit arrangements adapted to modify transducer output signals in a manner intended to compensate for the nonlinear characteristics inherent within the transducer. See, for example, U.S. Pat. Nos. 3,228,240 and 3,358,501. Adjustments of these circuits are done by trial and error at the expense of considerable calibration effort. Other linearization techniques have utilized programs that include lookup tables, best fit formulae such as the quadratic equation, linear interpolation, or cubic spline interpolation that modify the presented data. Solving these equations require the taking of many data points, and the solutions are approximations of best fit curves that can only be improved by taking additional data points. Likewise, the setting of the span during calibration is done by trial and error that also requires the taking of more data points.

Other linearization techniques, involving the shaping of the load cell element or the like, as described in U.S. Pat. Nos. 3,680,372 and 4,733,571, have been used. These techniques also require expenditure of additional time in complex machining.

Typically ten to thirty data points are taken during a calibration phase in order to provide sufficient information to define the characteristics of the transducer so that the final data can be presented to the required accuracy. Obviously, these efforts contribute substantially to cost and may only be partially acceptable where more accuracy is required.

There exists, therefore, a significant need for an improved method, including associated apparatus, for linearizing and spanning transducer data in a rapid and cost-efficient manner. The most cost-effective solution would be to reduce the number of data points taken during a calibration phase. The present invention fulfills these needs and provides further related advantages.

SUMMARY OF THE INVENTION

In accordance with the invention, an improved method, including the apparatus, is provided for spanning and linearizing output data from a transducer, such as a strain gauge load cell or the like. More specifically, the present invention provides for highly accurate spanning and linearization of output data based upon an equation derived from data obtained from calibration points taken only at mid-scale and full scale loads.

In the preferred form of the improved linearizing and spanning system, a constant can be derived from transducer calibration data which, when substituted into the equation, defines a mathematical curve that closely approaches the curve defined by all of the data points representing the actual transducer output. I have discovered that the representative curve turns out to be a parabola. I have also discovered that one of the parabolic parameters is the constant derived during calibration by the taking of only two data points, and that this constant has a direct relationship to the latus rectum of the representative parabola. Therefore, an equation can be derived that can be used to precisely correct for the nonlinear characteristics of a transducer.

Spanning of the transducer can be accomplished at the same time by multiplying the parabolic equation by a span factor (PF) which is determined during calibration.

The presentation of the equation is simplified by using normalized data. That is, the input and the output calibration data points are divided by their respective full scale values. The resulting normalized data is nondimensional. After the derivations are complete, the equations are later expanded for use.

Other features and advantages of the present invention will be apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
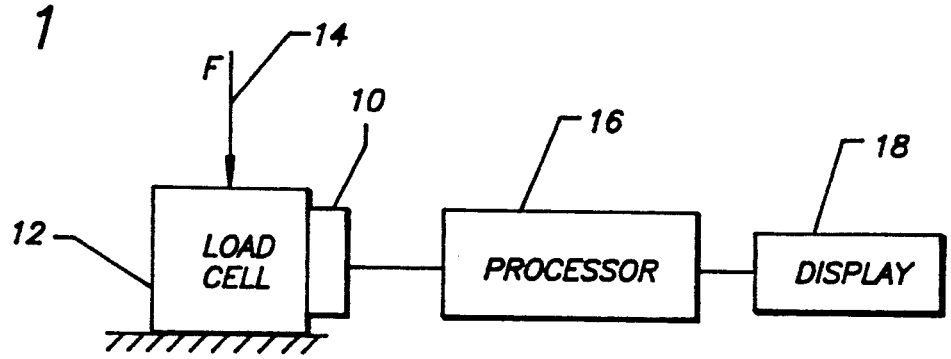
FIG. 1 is a schematic diagram representing a load cell in association with the basic components of a data linearization system embodying the novel features of the invention.

As shown in the exemplary drawings, an improved system and method are provided for spanning and linearizing data generated by a transducer referred to generally in FIG. 1 by the reference numeral 10. The transducer 10 is shown in association with a load cell 12 for generating an electrical output or data signal representative of an input such as a load or force 14 applied to the load cell 12. The present invention provides a linearization equation which can be derived from a small number of initial data calibration points to linearize the output data from the transducer 10 over a broad range of zero to full scale readings. The linearization equation, to be described in more detail, modifies the output data from the transducer 10 through the use of a processor 16 to linearize and span the data for digital viewing at a display 18.

More specifically, the apparatus and method defined as the present invention permits a transducer such as a strain gauge load cell or the like to be calibrated quickly and economically, in the course of production testing, and prior to shipment to a customer for installation and use in measuring selected phenomena and the like, where the measured phenomena or force (F) becomes the dependent variable in the equation. The invention permits transducer linearization by taking data at two calibration points, one at mid-scale and the other at full scale load, for the purpose of determining a parabolic constant that can be used to derive a second parabola which is representative of the transducer nonlinearity over the full range of readings. The linearization equation can be derived and programmed into the processor 16, such as a suitable microprocessor or computer, for the purpose of linearizing transducer output data.

The processor 16 may be integrated within the transducer 10 as an on-board item, or otherwise may be located externally of the transducer 10 and may be in association with the display 18.

I have discovered that the curve of a transducer can be precisely approximated by a mathematical parabolic curve (FIG. 3) which can be derived using a constant that is calculated from an extremely small number of calibration data points, namely, at mid-scale and at full scale load readings. As a result, I have discovered that a highly accurate linearization equation can be derived and used to linearize post-calibration transducer data.

More particularly, I have discovered that the parabolic curve that closely approximates the nonlinear characteristics of the transducer, wherein the constant (n) is functionally related to the latus rectum of an applicable parabola. This function is derived from calibration data as follows:

$$\text{Constant } (n) = \frac{PM}{PF} - \frac{RM}{RF}, \text{ wherein} \quad (1)$$

PM = mid-scale calibration load
PF = full scale calibration load
RM = mid-scale calibration data reading (in meter counts)
RF = full scale calibration data reading (in meter counts)

After the constant (n) has been determined, the mathematical equation of a parabola, which includes the actual normalized transducer data readings, may be modeled by multiplying the constant (n) by (4) and substituting the result into a general parabolic equation of the first standard form:

$$\text{Parabola } (x_i) = 4n \, (r_i)^2 \quad (2)$$

where:

$$(r_i) = R_i / RF \quad (3)$$

wherein $(r_i)$ is the independent variable, consisting of ten increments included for this example between (0) and (10), and $(x_i)$ constitutes the dependent variable, and wherein (4n) is the reciprocal of the latus rectum for the defined parabola. Test data is presented for increments (i) in digital form for evaluation.

Figure 2:
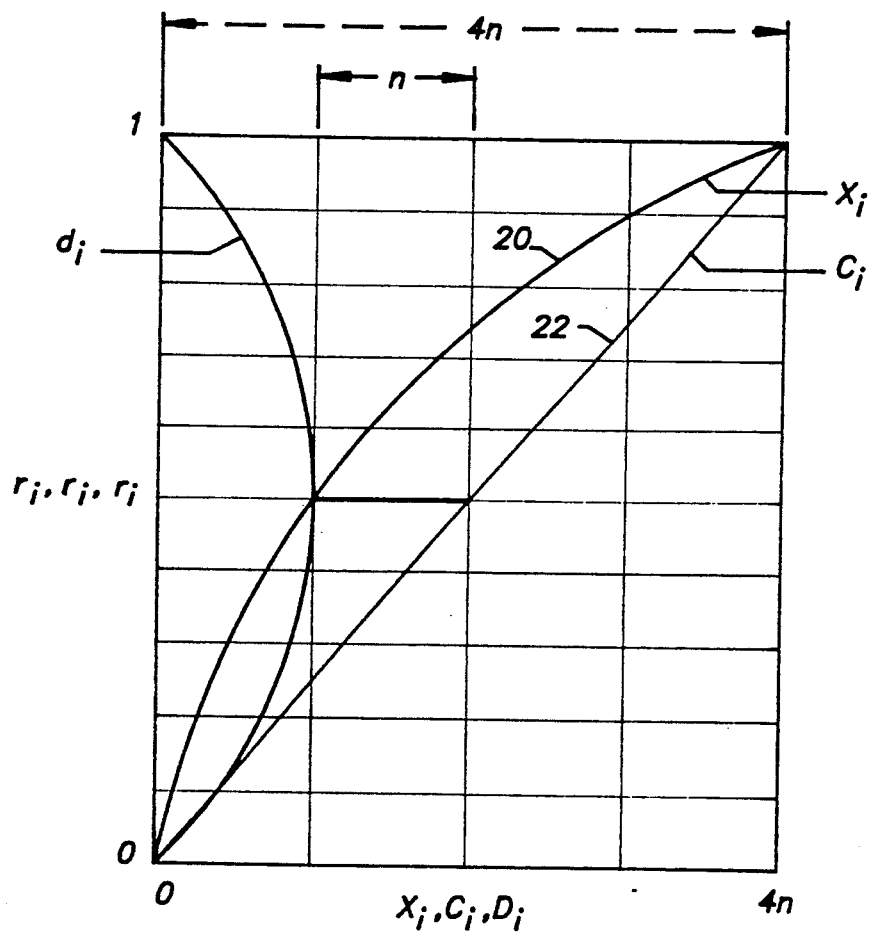
FIG. 2 is a graph that presents a classical mathematical parabola 20 referred to as "the parabola of the first standard form," with a vertex at the origin. This parabola is plotted in conjunction with the parabolic chord along with the nonlinear deviation taken between the chord and the parabola. The deviation describes a second parabola ($d_i$) that has the origin located at the ordinate ($p/2$), and at the abscissa ($n$), wherein ($n$) is equal to the distance between the parabola and the chord at the mid-scale point. When ($4n$) is substituted as a constant in the parabolic equation and the chord equation, and when these equations are plotted using the acquired data ($r_i$), I have discovered that the resulting mathematical equations have a direct relationship to the acquired data ($r_i$) and can be used to correct for the nonlinear characteristics of the transducer.

As plotted in FIG. 2, the constant (n) is included in the equations and becomes, as I have discussed, the deviation in normalized counts between the chord and the parabola at the mid-scale point. Then (4n), which is the reciprocal of the latus rectum, is the full scale value in normalized counts along the abscissa. By inserting the constant (4n) derived for this transducer into the parabolic equation the defined parabolic curve is representative of this particular transducer.

Having defined the parabola in terms of the independent variable $(r_i)$, it is now possible to further derive the straight line or chord $(c_i)$ passing between zero (vertex) and full scale output as follows, as referenced by the line 22 in FIG. 2:

$$(c_i) = 4n \times (r_i) \quad (4)$$

(formula for line 22)

Now the difference or deviation $(d_i)$ between the chord $(c_i)$ and the parabola $(x_i)$ for any given normalized data point reading $(r_i)$ is represented as:

$$(d_i) = (c_i) - (x_i) \quad (5)$$

The deviation ($d_i$) between the chord and the parabola plots as the second parabola. The foregoing equations are mathematical equations.

The nonlinear deviation of the transducer is defined as the difference between the applied input and the recorded output data at the respective applied input load. Normally, the transducer nonlinearity is quoted in percent of full scale output, but for this derivation the normalized data equations will be used. The equation representing the normalized nonlinear characteristics of a load cell is:

$$N_i = (p_i) - (r_i) \qquad (6)$$

where:

$$p_i = P_i/PF \text{ (from test data, FIG. 4)}. \qquad (7)$$

Figures 3, 4, 5:
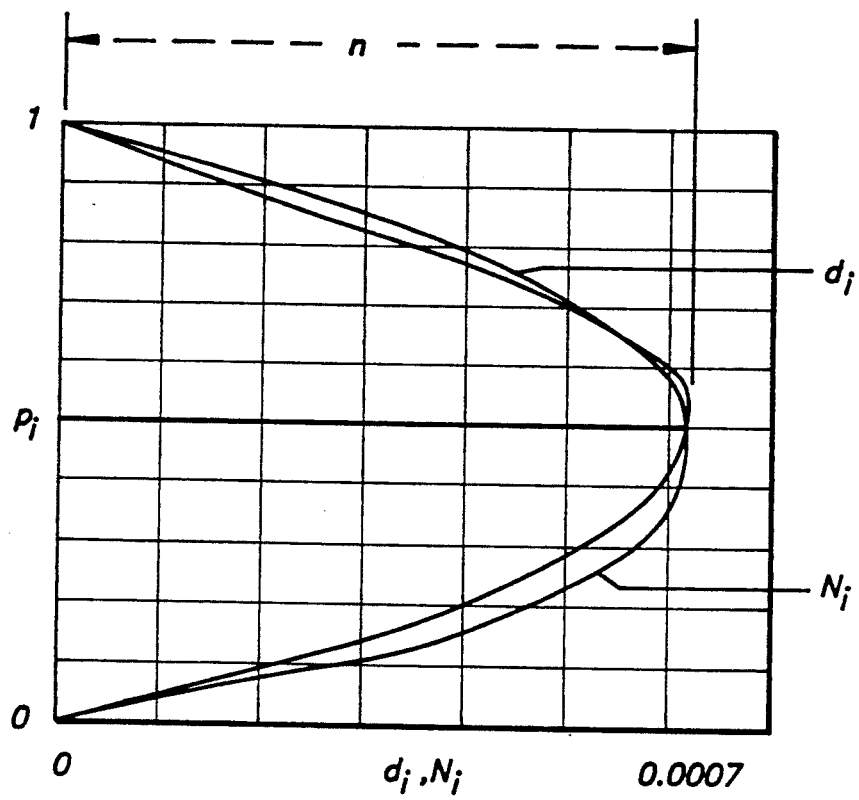
FIG. 3 contains a plot of the second parabola referred to in FIG. 2 which is included in order to make a direct comparison with the plot of the nonlinear characteristics of the acquired data. As seen from the comparison, the plot approaches a parabola. The difference between the mathematical parabola and the curve of the acquired data may be composed of the particular characteristics of the transducer or the scatter of the points may result from inaccuracies inherent in data acquisition. Since the nonlinear characteristics of the transducer plot has a curve that approaches the respective parabola, it stands that the respective parabolic curve defined from the two calibration points can be used to correct for nonlinearity.
FIG. 4 is a nonlinearized tabular presentation of data taken during a test of an exemplary transducer where the output is recorded and itemized along with the input applied load utilizing, for example, the load depicted in FIG. 1.
FIG. 5 is a tabular presentation of data taken from the example of FIG. 4, after being linearized in accordance with present invention.
Figures 6, 7:
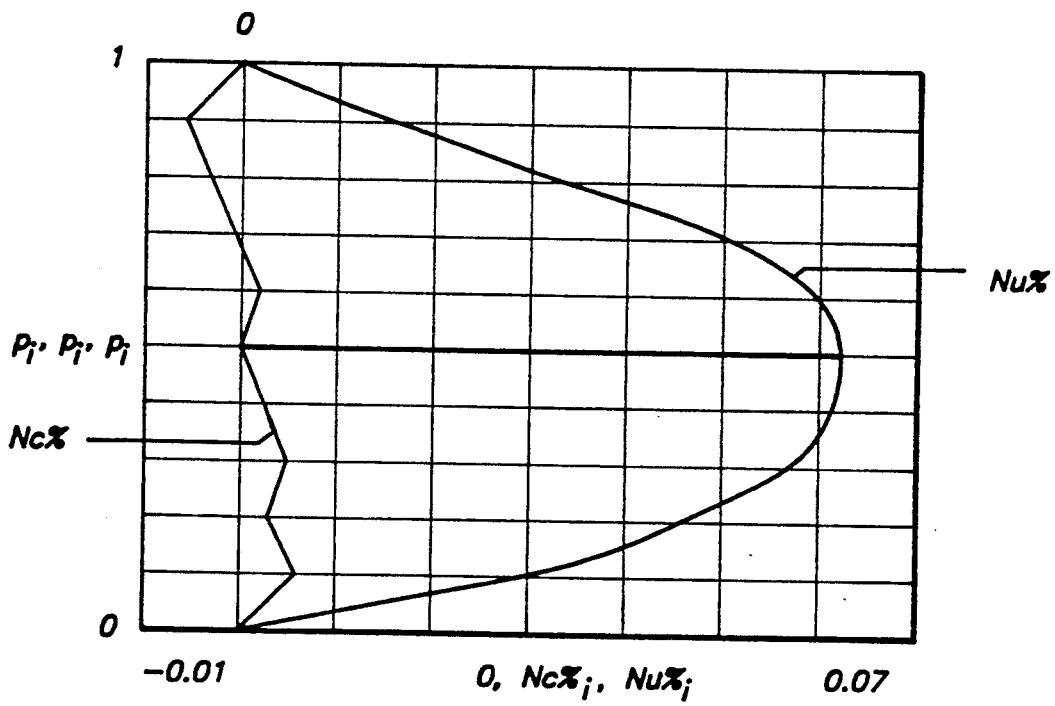
FIG. 6 is the itemized output data taken from FIG. 5, which when multiplied by the span factor, becomes indicative of the unknown applied force. The forces correlate with the applied loads taken from FIG. 2 generally to within the accuracy limits that are attainable in recording data.
FIG. 7 a plot of the load cell nonlinearity deviation defined in percent of full scale output before and after linearization, depicting approximately 1000% improvement.

To demonstrate that a plot (FIG. 3) using load cell test data from FIG. 4 approximates a parabola, mathematical deviations from Eq. 5 are plotted against load cell deviations from Eq. 6. A study indicates that the curves are almost identical. Though some of the differences may result from the load cell characteristics, most of difference and the scatter probably results from the inaccuracies of the calibration and recording equipment. The closer the transducer output curve matches the mathematical parabola, the more accurate the corrected data becomes.

TRANSDUCER CHARACTERISTICS

Heretofore, all the calibration data listed in the table of FIG. 4 was acquired:

(i) to derive the equation identifying the calibration constant (n);
(ii) to demonstrate that the particular characteristic of a transducer conforms to parabolic equations; and
(iii) to compare the linearized force to the applied load for ten data points in order to demonstrate the improvement claimed for the invention.

To accomplish the third objective, it has to be assumed that the transducer has been calibrated at mid-scale and full scale, and that all subsequent readings ($r_i$) represent unknown forces ($F_i$) which will be converted and displayed by the instrument. In this case the input readings ($r_i$) will become the independent variable and the force which is represented by output ($F_i$) becomes the dependent variable. Under these conditions, all readings taken after the calibration are new readings which will be linearized through the use of the mathematical parabolic equation derived as Eq. 5. From the foregoing, linearization as accomplished by adding the mathematical deviation ($d_i$) calculated from Eq. 5 to the subsequently recorded meter readings taken after calibration. This equation is:

$$(F_i) = (r_i) + (d_i) \qquad (8)$$

Then, by expanding Eq. (8) by substitution from Eq. 4:

$$(F_i) = [r_i + 4n(r_i) - 4n(r_i)^2] \qquad (9)$$

Further expansion of equation (9) by substituting calibration points:

$$(F_i) = [R_i/RF + 4n(R_i/RF) - 4n(R_i/RF)^2] \qquad (10)$$

wherein ($R_i$) are the subsequently acquired data readings of the transducer during normal operation.

Factoring:

$$(F_i) = [1 + 4n \times (1 - (R_i/RF))] \times (R_i/RF) \text{ (linearized)} \qquad (11)$$

By multiplying Eq. (11) by the full scale calibration load (PF) obtained during calibration, the equation is expanded to remove the normalization and to span the output:

$$(F_i) = [1 + 4n \times (1 - (R_i/RF))] \times [R_i \times (PF/RF)] \text{ (spanned)} \qquad (12)$$

As previously explained, (n) is derived from calibration data (n = PM/PF − RM/RF which reduces to (n = ½ − RM/RF), such that:

$$(4n) = 2 - 4 \times (RM/RF) \qquad (13)$$

By substitution:

$$(F_i) = [1 + (2 - 4(RM/RF)) \times (1 - (R_i/RF))] \times R_i(PF/RF) \qquad (14)$$

As derived, Eq. (14) is spanned and linearized.

The foregoing formula (14) provides the general case linearization and spanning equation, wherein the linearization equation has only a single unknown, namely, ($R_i$). The remaining data (PF), (RF), and (RM) are determined by calibration, as described previously. Therefore, any transducer reading ($R_i$) taken during normal operation can be converted to represent a force according to the equation (14) by substituting the actual data reading ($R_i$) in the equation. This gives ($F_i$) for any respective point.

Since, during normal use, it is only required to calibrate the transducer at two points in order to establish the constant (n), these values can be extracted from the data given in the table FIG. 4. The readings of the mid-scale and full scale load in pounds are (PM = 50,000 and PF = 100,000) which correspond to the mid-scale and full scale data readings in counts which are (RM = 49,936 and RF = 99,995). The constant (n) can be defined using Eq. (1).

From the foregoing, it is evident that the transducers can be calibrated and spanned easily and quickly.

Various modifications and improvements to the above-described data linearization system and method will be apparent to those skilled in the art. Accordingly, no limitation on the invention is intended by way of the foregoing description and accompanying drawings, except as set forth in the appended claims.

What is claimed is:

1. A method of linearizing transducer output data in response to a mechanical input, said method comprising the steps of:

obtaining transducer output data readings during calibration at mid-scale and at full scale data points, respectively in response to known mid-scale and full scale mechanical calibration inputs;

defining a parabola in terms of the mid-scale and full scale data readings, wherein the parabola represents a close approximation of the deviation between actual nonlinear transducer output data and desired linearized transducer output data over a range of zero to full scale data points;

obtaining a subsequent transducer output data reading in response to an unknown mechanical input, and adding the deviation applicable to a specific data point corresponding to said subsequent transducer output data reading to obtain a linearized output data reading.

2. The method of claim 1 further including the step of spanning the linearized output data reading.

3. The method of claim 2 wherein said spanning step comprises the step of multiplying the linearized output data reading by the full scale mechanical calibration input.

4. The method of claim 1 wherein said parabola defining step includes the step of defining the parabola in terms of a constant (n) as a function of actual mid-scale and full scale mechanical inputs, and as a function of actual mid-scale and full scale data point readings.

5. The method of claim 4 wherein the constant (n) equals the ratio of the mid-scale to full scale mechanical calibration inputs less the ratio of the mid-scale to full scale data point readings.

6. The method of claim 4 wherein said parabola defining step includes the step of defining the constant (n) wherein the constant (n) is functionally related to the latus rectum of the defined parabola.

7. The method of claim 1 wherein the parabola is defined in terms of normalized transducer data.

8. A system for linearizing transducer output data in response to a mechanical input, said system comprising:
    transducer means for obtaining an actual nonlinear transducer data point reading in response to an unknown input; and
    processor means for defining a parabola in terms of transducer data point readings at mid-scale and full scale in response to known mid-scale and full scale mechanical calibration inputs, wherein the parabola is representative of a close approximation of the deviation between actual nonlinear transducer output data and desired linearized transducer output data over a range of zero to full scale data points, said processor means including means for adding the deviation to the actual nonlinear output data point to obtain a linearized output data reading.

9. The system of claim 8 wherein said processor means further includes means for spanning the linearized output data reading.

10. The system of claim 9 wherein said spanning means includes means for multiplying the linearized output data reading by the full scale calibration input.

11. The system of claim 8 wherein said transducer means comprises a load cell.

12. A method of linearizing transducer output data in response to a mechanical input, said method comprising the steps of:
    obtaining transducer output data readings during calibration at mid-scale and at full scale data points, respectively in response to known mid-scale and full scale mechanical calibration inputs;
    defining a geometric curve in terms of the mid-scale and full scale data readings, wherein the geometric curve represents a close approximation of the deviation between actual nonlinear transducer output data and desired linearized transducer output data over a range of zero to full scale data points;
    obtaining a subsequent transducer output data reading in response to an unknown mechanical input; and
    adding the deviation applicable to a specific data point corresponding said subsequent transducer output data reading to obtain a linearized output data reading.

13. The method of claim 12 further including the step of spanning the linearization output data reading.

14. A system for linearizing transducer output data in response to a mechanical input, said system comprising:
    transducer means for obtaining an actual nonlinear transducer data point reading in response to an unknown input; and
    processor means for defining a geometric curve in terms of transducer data point readings at mid-scale and full scale in response to known mid-scale and full scale mechanical calibration inputs, wherein the geometric curve is actual nonlinear transducer output data and desired linearized transducer output data over a range of zero to full scale data points, said processor means including means for adding the deviation to the actual nonlinear output data point to obtain a linearized output data reading.

15. The system of claim 14 wherein said processor means further includes means for spanning the linearized output data reading.

* * * * *